US008276069B2

(12) United States Patent
Chen et al.

(10) Patent No.: US 8,276,069 B2
(45) Date of Patent: Sep. 25, 2012

(54) METHOD AND SYSTEM FOR AUTOMATICALLY GENERATING AN ADAPTIVE USER INTERFACE FOR A PHYSICAL ENVIRONMENT

(75) Inventors: Enyi Chen, Beijing (CN); Rui Zhang, Beijing (CN); John R. Hajdukiewicz, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1263 days.

(21) Appl. No.: 11/729,459

(22) Filed: Mar. 28, 2007

(65) Prior Publication Data

US 2008/0244421 A1  Oct. 2, 2008

(51) Int. Cl.
*G06F 3/00* (2006.01)
(52) U.S. Cl. ......................... 715/700; 715/744
(58) Field of Classification Search .............. 715/744, 715/746, 700
See application file for complete search history.

(56) References Cited

U.S. PATENT DOCUMENTS

| | | | | |
|---|---|---|---|---|
| 6,941,521 | B2 | 9/2005 | Lin et al. | 715/762 |
| 7,010,635 | B1 * | 3/2006 | Phillips et al. | 710/305 |
| 7,134,601 | B2 | 11/2006 | Silverbrook et al. | 235/462.15 |
| 7,440,775 | B2 * | 10/2008 | Lee et al. | 455/557 |
| 7,613,893 | B2 * | 11/2009 | Saint-Hilaire et al. | 711/170 |
| 2003/0126239 | A1 * | 7/2003 | Hwang | 709/220 |
| 2004/0205715 | A1 | 10/2004 | Taylor | 717/120 |
| 2005/0082361 | A1 | 4/2005 | Silverbrook et al. | 235/375 |
| 2005/0172242 | A1 | 8/2005 | Vienneau et al. | 715/801 |
| 2006/0121919 | A1 * | 6/2006 | Amishima et al. | 455/466 |
| 2006/0230379 | A1 | 10/2006 | Pintos | 717/109 |
| 2006/0291456 | A1 * | 12/2006 | Clout et al. | 370/356 |
| 2007/0226311 | A1 * | 9/2007 | Kaarela et al. | 709/217 |
| 2008/0008114 | A1 * | 1/2008 | Kaarela et al. | 370/328 |

OTHER PUBLICATIONS

UPnP Device Architecture 1.0, Version 1.0.1, Dec. 2, 2003.
Cross-Modal Interaction Using XWeb; D.R. Olsen Jr., S.Jeffries, T. Nielsen, W. Moyes, P. Fredrickson; Computer Science Department, Brigham Young University, Provo, UT.
ICrafter: A Service Framework for Ubiquitous Computing Environments; S. R. Ponnekanti, B. Lee, A. Fox, P. Hanrahan, T. Winograd; Stanford University.
Generating Remote Control Interfaces for Complex Appliances; J. Nichols, B.A. Myers, M. Higgins, J. Hughes, T.K. Harris, R. Rosenfeld, M. Pignol; Human Computer Interaction Institute and MAYA Design, Inc.
Pervasic Computing: Vision and Challenges; M. Satyanarayana; School of Computer Science; Carnegie Mellon University; IEEE Personal Communications, 2001.

(Continued)

*Primary Examiner* — Manglesh M Patel
(74) *Attorney, Agent, or Firm* — Kermit D. Lopez; Luis M. Ortiz; Melissa A. Asfahani (57) ABSTRACT

A system and method for automatically generating an adaptive user interface for a plurality of appliances within a physical environment. Appliance description specifications of the appliances are generated from provided appliance functionality information and semantic information of related appliances and/or related environment information. The appliance description specifications can be analyzed to construct a semantic functionality relationship among the appliances and the adaptive user interface can be rendered based on an interface elements relationship which is a transformation of the semantic functionality relationship. The system has a user interface rendering module, which when run on a controller, implements the aforesaid appliance description specification generation and analysis, and adaptor modules, which when run on the appliances, maintain the appliance description specifications and allow exchange of same between the controller and appliances.

20 Claims, 11 Drawing Sheets

OTHER PUBLICATIONS

Supple: Automatically Generating User Interfaces; K. Gajos, D.S. Weld; IUI '04 Jan. 13-16, 2004, Madeira, Funchal, Portugal.

The Computer for the $21^{st}$ Century; M. Weiser; Pervasive Computing; Jan.-Mar. 2002.

J. Nichols, B. A. Myers, M. Higgins, Jo. Hughes, T K. Harris, R. Rosenfeld, M. Pignol; Generating Remote Control Interfaces for Complex Appliances; UIST '02, Oct. 27-30, 2002, vol. 4, Issue 2.

K. Gajos, D. Christianson, R. Hoffman, T. Shaked, K. Hanning, J J. Long, D.S. Weld; Fast and Robust Interface Generation for Ubiquitous Applications.

PCT—Notification of Transmittal of the International Search Report and The Written Opinion of the International Searching Authority, or the Declaration, Date of Mailing Sep. 17, 2008.

* cited by examiner

FIG. 1

THE STATE VARIABLE AND RELATED OPERATION

| STATE VARIABLE | TYPE | RELATED OPERATION |
|---|---|---|
| POWER | BOOLEAN | SETPOWER() |
| DIMLEVEL | INTEGER | SETDIM() |

FIG. 2A

THE STATE VARIABLE AND ITS RELATION

| RELATION | MEANING |
|---|---|
| $R_l=<Power, DimLevel>$ | DIMLEVEL IS INACTIVE IF POWER IS FALSE |
| | DIMLEVEL IS ACTIVE IF POWER IS TRUE |

FIG. 2B

| RELATION | MEANING |
|---|---|
| NEXT<OBJECT1, OBJECT2> | PUT OBJECT2 NEXT TO OBJECT1 |
| NEXT<OBJECT3, OBJECT4> | DRAW LINE BETWEEN OBJECT3 AND OBJECT4 |

METHOD AND SYSTEM FOR AUTOMATICALLY GENERATING AN ADAPTIVE USER INTERFACE FOR A PHYSICAL ENVIRONMENT

TECHNICAL FIELD

Embodiments relate to generating user interfaces and, more particularly, to systems and methods of generating a user interface for a plurality of appliances.

As technology develops, the physical environment (where we live or work, such as living room, workspace, meeting room and etc) is becoming increasingly equipped or embedded with various kinds of appliance devices or sensor devices, such as light switches, projectors, printers, televisions, VCRs, stereo equipment, thermometers and humidity sensors.

The trend is to design these appliances with many complex functions, and to connect them to the computer network. So, just as the ubiquitous computing promises us, we can seamless access these appliances and sensors regardless of the user's physical location. For example, in an intelligent building, the administrator can control devices and monitor sensors of every room in the control center. In a meeting room, the user can access a projector and control the light to give his slide presentation. If the user were in a remote location, he can use a mobile device, such as PDA or mobile phone to control these appliances.

However, to use these appliances, their user interfaces must be provided. These user interfaces need to be displayed on various kind of controller devices. Although the appliances can provide user interfaces for a controller to manipulate, as nowadays some products provide web pages, it is impossible for the human programmer to create high quality interfaces for each type of controller due to its heterogeneity. For example, a web page, designed for the desktop, is too large for the PDA so that the user must drag the scroll bar from time to time. This becomes even more of a problem if the page is displayed on the cell phone.

Besides, to perform a task, such as a presentation or a meeting, the users often need to control several appliances simultaneously. Of course, the user can manipulate multi single user interfaces to perform his task, but this is generally inconvenient. For example, suppose that a user wishes to pick up some pictures stored in a camera and print them using a printer. By the current method, the user would access the camera's user interface and pick up some pictures to save to a temporary location, and then access the printer's user interface and upload these pictures for printing.

Furthermore, displaying interfaces of multiple appliances in a single window is impossible using a controller which has limited display size because the window is simply not big enough to allow all the interfaces to be properly viewed by the user.

There is a need to provide a methodology of displaying multiple appliances interfaces in a more efficient and effective manner.

The embodiments disclosed herein therefore directly address the shortcomings of known techniques of displaying appliance interfaces

BRIEF SUMMARY

It is therefore one aspect of the embodiments to provide an improved method for displaying interfaces of multiple appliances.

It is a further aspect of the embodiments to provide an automated system for displaying interfaces of multiple appliances.

The aforementioned aspects and other objectives and advantages can now be achieved as described herein. In one aspect, a method of automatically generating an adaptive user interface for a plurality of appliances within a physical environment is provided. Appliance description specifications of the appliances are generated from appliance functionality information and semantic information of related appliances and/or related environment information provided to the user interface rendering module, for example by a user via a user interface. The semantic information can be for example information corresponding to appliance type, appliance location and/or appliance interactions. An adaptive user interface is then rendered based on the appliance description specifications.

Advantageously, rendering the adaptive user interface based on appliance description specifications generated from appliance functionality information and semantic information of related appliances and/or related environment enables a single user interface for multiple appliances of a physical environment to be rendered in a display window in an effective and efficient manner. Furthermore, this approach allows the user interface to be dynamically modified to reflect updates or additions of appliances or other objects in the physical environment.

The adaptive user interface can be rendered by analyzing the appliance description specifications to construct a semantic functionality relationship among the appliances in the physical environment; transforming the semantic functionality relationship into an interface elements relationship; and then rendering the adaptive user interface based on the interface elements relationship.

Each of the appliance description specifications can be generated by representing the appliance functionality information as a set of state variables and corresponding operations and representing the semantic information as a set of relations among the state variables. The adaptive user interface can be refreshed in response to a change in a state variable of the appliance.

Each of the appliance description specifications can be analyzed by determining a hierarchical relationship between appliances and state variables; forming a functionality tree maintaining the appliance state variables, corresponding operations and relations among the state variables; analyzing semantic information included in each of the appliance descriptions; assembling appliances in close relationship in a group; creating a virtual node to represent the group; setting the virtual node as a parent of appliances and child of environment; and adding widgets among appliances to represent semantic relationship.

The appliance description specifications can be maintained at corresponding appliances and retrieved from the appliances for analysis.

The appliance description specifications can be updated, changed or added and the adaptive user interface updated or changed in response thereto which is advantageous in that the adaptive user interface can be modified to reflect a change in the appliances or environment, such as additions of appliances, or changes in appliance locations or functions. Also a particular appliance can be discovered among the plurality of appliances in response to manipulating a user interface to facilitate generation of the appliance description specification for that particular appliance.

According to another aspect, an automated system has a plurality of appliances adapted and arranged to maintain corresponding appliance description specifications and a controller, operably connectable to the appliances; adapted to generate the appliance description specifications from appliance functionality information and semantic information of related appliances and/or related environment information provided to the controller. The semantic information can be, for example, information corresponding to appliance type, appliance location and/or appliance interactions. The controller is further adapted to exchange the appliance description specifications between the appliances and the controller and render an adaptive user interface based on the appliance description specifications.

The controller can be adapted to render the adaptive user interface by analyzing the appliance description specifications to construct a semantic functionality relationship among the appliances in the physical environment, transforming the semantic functionality relationship into an interface elements relationship based on the properties of the controller, and render the adaptive user interface based on the interface elements relationship. Advantageously, transforming the semantic functionality relationship into an interface elements relationship based on the properties of the controller enables optimization of the adaptive user interface rendering on all different types of controllers.

The appliance functionality information of the appliance description specifications can be represented as a set of state variables and corresponding operations; and semantic information represented as a set of relations among the state variables.

The controller can be further adapted to update or change the adaptive user interface in response to a change in an appliance state variable and/or an addition of an appliance.

According to yet another aspect, a system has a plurality of appliance adaptor modules adapted to maintain appliance description specifications of corresponding appliances in a physical environment, and a user interface rendering module adapted to generate the appliance specifications from appliance functionality information and semantic information of related appliances and/or related environment information provided to the user interface rendering module. The user interface rendering module is adapted to exchange the appliance description specifications between the appliance adaptor modules and the user interface rendering module, and render an adaptive user interface based on the appliance description specifications.

The user interface rendering module can render the adaptive user interface based on the appliance description specifications by analyzing the appliance description specification to construct a semantic functionality relationship among the appliances in the physical environment; transforming the semantic functionality relationship into an interface elements relationship; and rendering the adaptive user interface based on the interface elements relationship.

Each of the appliance description specifications can include functionality information comprising a set of state variables and corresponding operations and the semantic information can comprise a set of relations among the state variables.

The user interface rendering module and appliance adaptor modules can each include an interaction protocol for exchanging information between the user rendering module and the appliance adaptor modules.

The interaction protocol can be for example an UPnP protocol. The user interface rendering module can include a SUPPLE user interface algorithm for rendering the adaptive user interface.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

DETAILED DESCRIPTION

The particular values and configurations discussed in these non-limiting examples can be varied and are cited merely to illustrate at least one embodiment of the present invention and are not intended to limit the scope of the invention.

The method and system for generating an adaptive user interface for physical environment of the illustrative embodiments provides an approach to enable a single adaptive user interface for multiple appliances of a physical environment to be rendered in a display window in an effective and efficient manner. Furthermore, the approach enables the user interface to be dynamically modified to reflect updates or additions of appliances or other objects in the physical environment.

Figure 1:
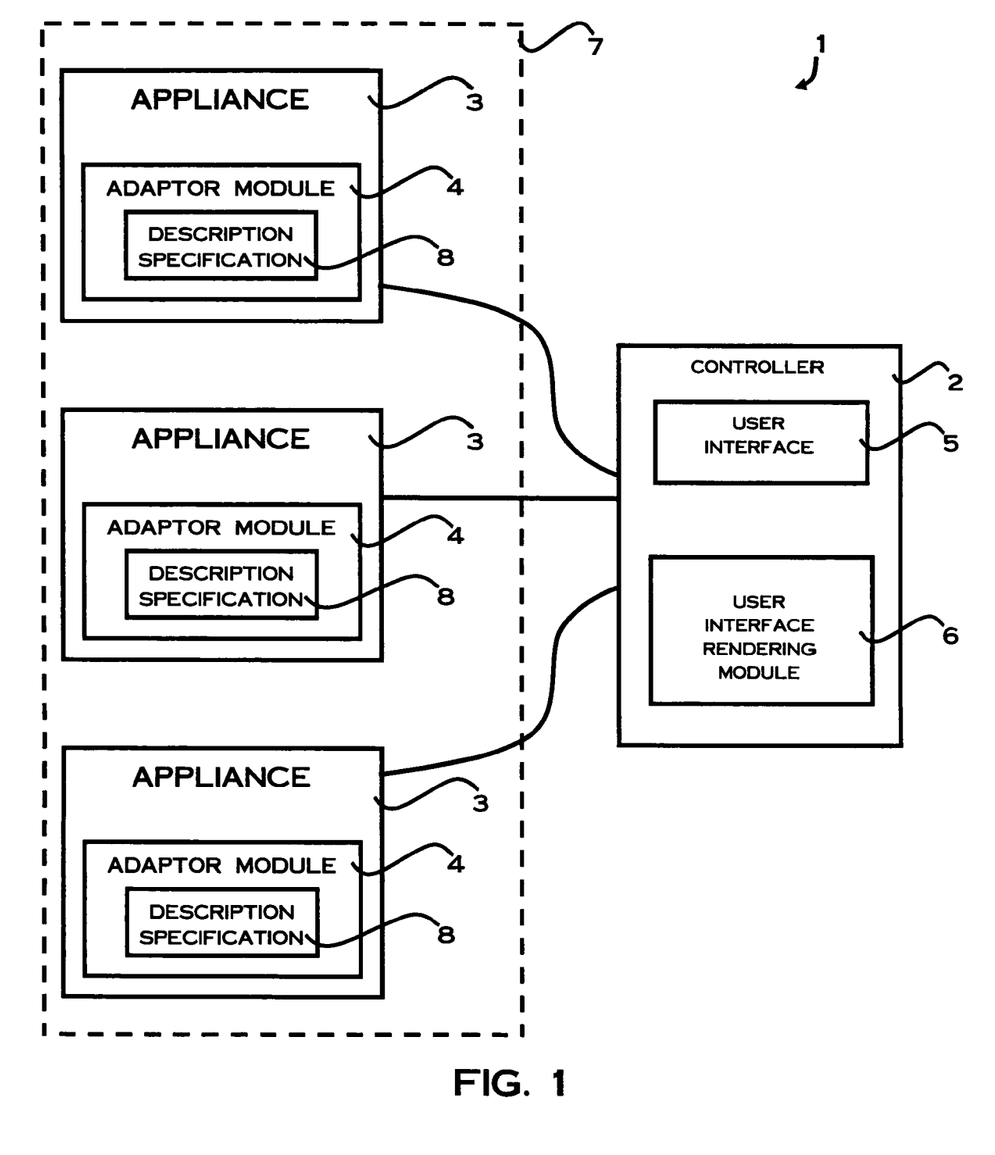
FIG. 1 illustrates a general block diagram of an automated system for practicing the illustrative embodiment.

Referring to FIG. 1 of the accompanying drawings, which illustrates a general overview of an automated system, a suitable environment 1 for practicing the illustrative embodiment can be an automated system having a controller 2 operably connectable to a plurality of appliances 3 of a physical environment 7. The physical environment 7 can be any environment, such as, where we work or live in which appliances are located or associated.

For the purposes of discussion hereinafter, an "appliance" refers to any appliance or sensor device which can provide some functionality or information to user of the controller. For example, a projector is an appliance which can project the user's desktop to the wall, and a thermometer is an appliance which can give the environment's temperature information. Some typical examples of appliances are building lights, facsimile machines, televisions, computer servers, cameras, projectors or printers. Also, for the purposes of discussion hereinafter "controller" refers to any device which is capable of displaying the appliance's user interface so that the user can manipulate the appliances or view their states. The controller of the automated system can be for example implemented as a laptop, computer, PDA or mobile phone.

As indicated in FIG. 1, the controller 2 has a user interface 5 and a user interface rendering module 6 implemented thereon which is configured to communicate with a plurality of adaptor modules 4 each of which are implemented on a respective appliance 3.

Those skilled in the art would understand that the illustration of FIG. 1 is merely depicting one example of the embodiments and that the embodiments are not limited thereto. The user interface rendering module 6 and/or adaptor modules 4 may be hardware, or alternatively, software. Whilst the user interface rendering module 6 is run locally on the controller 2 and the adaptor modules 4 are run locally on respective appliances 3 in the embodiment of the automated system of FIG. 1, some or all of the modules can be run from a remote location via a network coupled to the automated system. Those skilled in the art would know that there are multiple modes of implementing such modules.

As a general overview of the system 1, each appliance adaptor module 4, when run on a corresponding appliance 3, maintains an appliance description specification 8 of the corresponding appliance 3. The user interface rendering module 6, when run on the controller 2, initially generates the appliance description specifications 8 from appliance functionality information and semantic information of related appliances and/or related environment information provided to the controller 2. The user interface rendering module 6 also exchanges the appliance description specifications 8 between the adaptor modules 4 and user interface rendering module 6 and renders an adaptive user interface 5 based on the appliance description specifications 8.

Advantageously, generating the aforementioned appliance description specification 8 and rendering an adaptive user interface 5 on the controller 2 based on the appliance description specifications 8 allows a human programmer to conveniently and automatically create a high quality user interface 5 of multiple appliances 3. The user interface 5 can be displayed on any type of controller 2 in an efficient and effective manner so that the user can conveniently and easily manipulate the appliances 3 or view their states. The human programmer can design a whole user interface for a physical environment based on the functionality and semantic relationship between the appliances 3.

As will be explained in more detail, the user interface 5 rendering module renders the adaptive user interface based on the appliance description specifications by analyzing the appliance description specifications to construct a semantic functionality relationship among the appliances 3 in the physical environment and then rendering the adaptive user interface 5 using an interface elements relationship obtained from the semantic functionality relationship.

Figure 5:
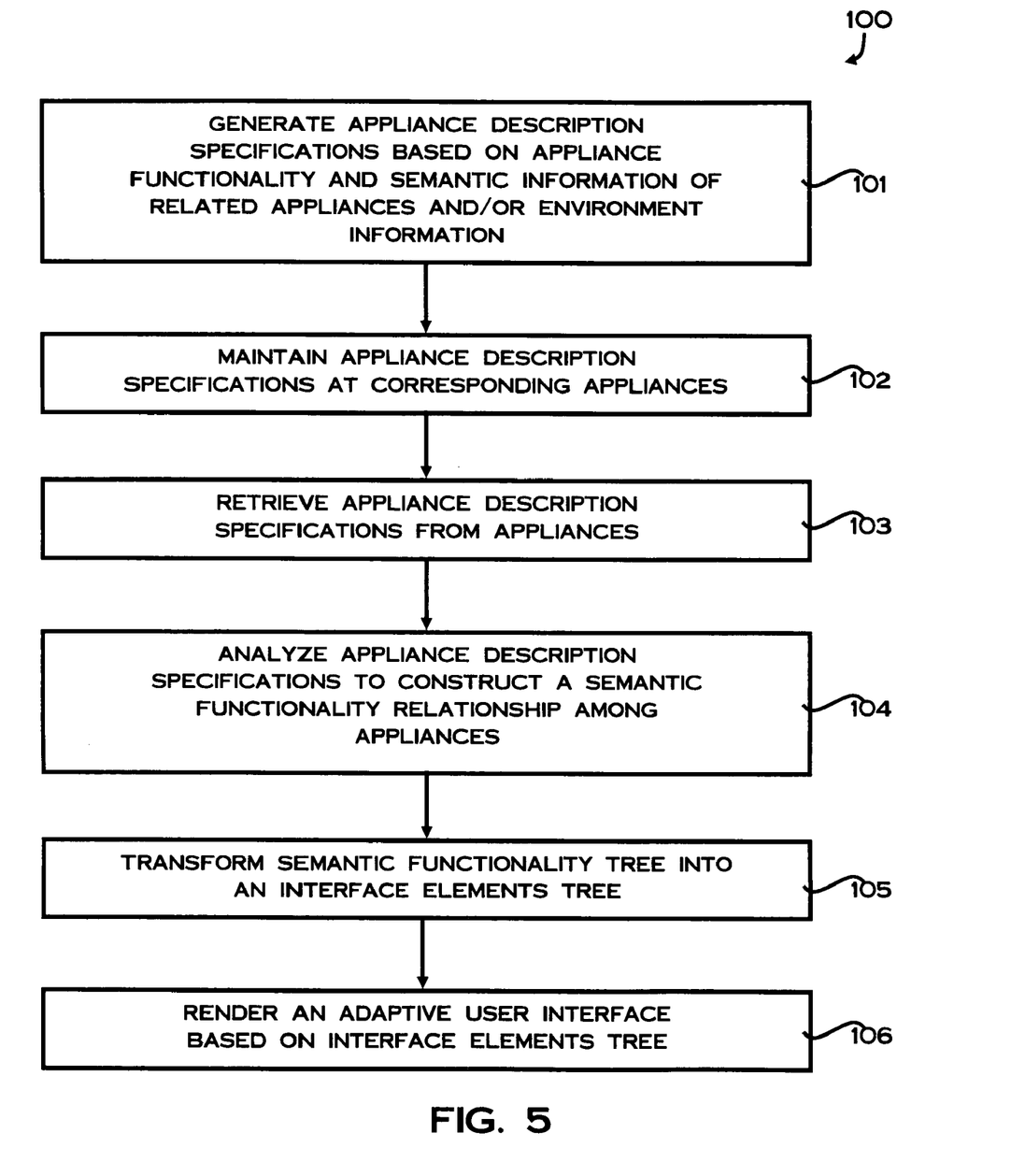
FIG. 5 provides a general overview of the steps performed in a method of automatically generating an adaptive user interface for a plurality of appliances within a physical environment in accordance with a preferred embodiment.

FIG. 5 provides a general overview of the steps performed in a method of automatically generating an adaptive user interface 5 for a plurality of appliances 3 within a physical environment in accordance with an embodiment. This method can be implemented in an automated system, such as for example, the automated system 1 of the illustrative embodiment of FIG. 1. A general outline of the method 100 implemented in system 1 can be provided as follows. As indicated initially in process step 101, the appliance description specifications 8 of the appliances 3 in the physical environment 7 are generated based on appliance 3 functionality information and semantic information of related appliances and/or related environment information. If necessary, the appliance description specifications 8 are maintained at corresponding appliances and retrieved therefrom as required, as indicated in process steps 102 and 103. Thereafter, the appliance description specifications 8 are analyzed to construct a semantic functionality relationship among the appliances 3 in the physical environment, as indicated in process step 104. Then, the semantic functionality relationship is transformed into an interface elements relationship, as indicated in process step 105. The adaptive user interface 5 is rendered based on the interface elements relationship, as indicated in process step 106.

In order to more adequately explain process step 101, reference will now be made to its implementation in the automated system of FIG. 1 according to one embodiment. In order to generate the appliance description specification 8 of an appliance 3, the user or developer via the controller user interface 5 models an appliance 3 as a tuple, which abstracts the appliance's function, including a set of state variables, the corresponding operations and the relation among them. Based on the model, the developer can generate the appliance description specification 8 via the controller user interface 5 to describe its functionality, as well as semantic information between related environment objects (including related appliances and environment information).

Figure 2A:
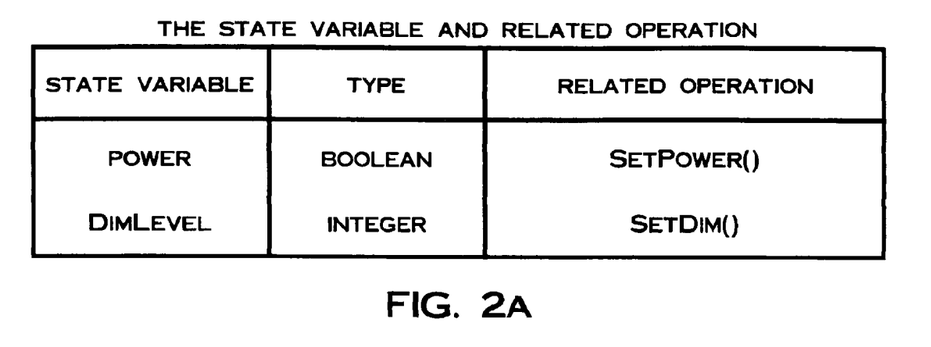
FIGS. 2A and 2B illustrate tables showing a dimmable light functionality information represented as two state variables, two operations and a relation.
Figure 2B:
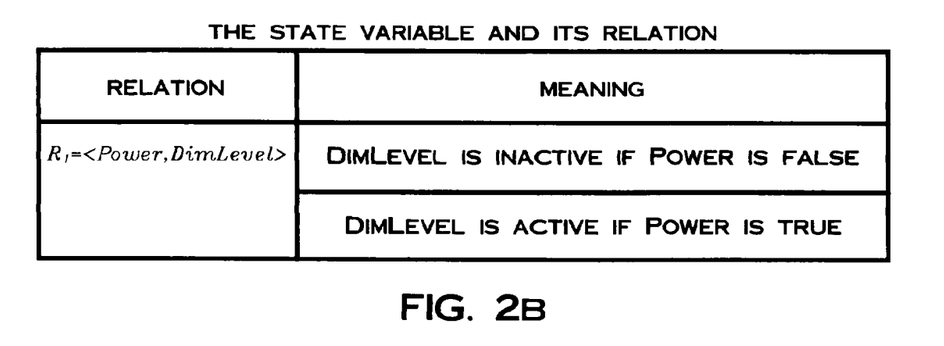

Abstraction of the appliance's function to represent it as a set of state variables and corresponding operations is performed by the user interface rendering module 6 so that the functionality of the interface can be exposed to the user. In addition, abstraction of the relation among state variables is performed so that the user can also be informed of how the state variables of an appliance 3 can affect with each other. Consequently, an appliance 3 can be modeled according to the following equation:

In order more to adequately explain the above model, let us assume by way of example that an appliance description specification 8 of a dimmable light is to be generated. The dimmable light can be switched on or off, and has adjustable brightness that is adjustable so this functionality information can be modeled according to the tables depicted in FIGS. 2A and 2B which illustrate that the dimmable light functionality information can be represented as two state variables, two operations and a relation, As for semantic information between related environment objects, these can be defined as the following relation (I):

$$I = F^+ = \{F, F \times F, F \times F \times F, \ldots\} \qquad \text{Eq. 2}$$

where:

F is defined as the Eq. 1, which represents a appliance; and
F+={F, F×F, F×F×F, . . . }, is a set of relations among the appliances.

Figure 2C:
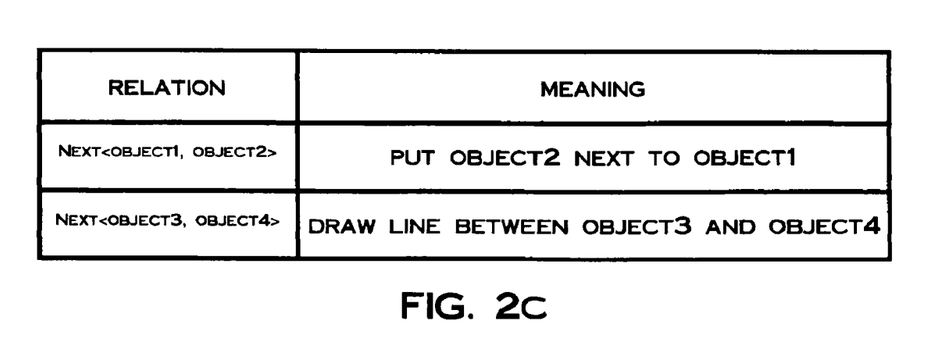
FIG. 2C illustrates an example of how the semantic information of related appliances and/or related environment information can be represented.

The semantic information among appliances can be stored in a specific appliance in a physical environment. In the embodiment of the automated system of FIG. 1, the semantic information among appliances can be stored in one of the appliances 3. To illustrate the relation (I), let us assume that we need to put a user interface of two appliances together or draw a line between two appliances. These semantic relations can be modeled according to the table depicted in FIG. 2C, which illustrates an example of how the semantic information of related appliances and/or related environment information can be represented. The two appliances to be put together can be represented as objects 1 and 2 whereas the two appliances between which the line is to be drawn can be represented as objects 3 and 4. From this semantic information, we can get put object 2 next to object 1, and draw a line between object 3 and object 4 when generating the final interface.

Figure 6:
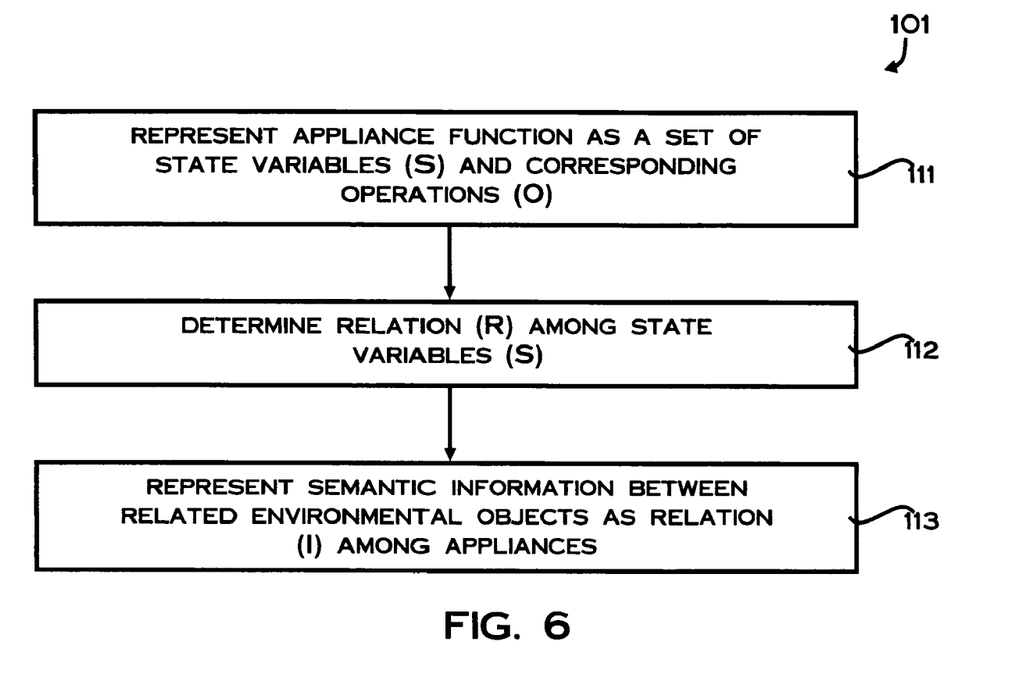
FIGS. 6 and 7 illustrate in more detail the process steps 101 and 104, respectively, of the method of FIG. 5.

FIG. 6 illustrates the general steps involved in the process step 101 of generating appliance description specifications 8 of the appliances 3 in the physical environment using the above model. As indicated in process step 111, the appliance function is represented as the set of state variables (S) and corresponding operations (O). The relation (R) among state variables (S) is determined (process step 112). The semantic information between related environmental objects is also represented (process step 113).

The process step 104 of FIG. 5 will now be described in more detail with reference to FIG. 7, which illustrates in more detail the process step 104 of analyzing the appliance description specifications 8 to construct a semantic functionality relationship among the appliances 3 in the physical environment according to one embodiment. Initially, functionality information included in appliance description specifications 8 is analyzed (process step 114). The hierarchical relationship between appliances 3 and state variables (S) is then determined (process step 115). The hierarchical relationship is represented as a multi-layer tree structure maintaining appliance state variables (S), corresponding operations (O) and the relation (R) (process step 116). Thereafter, semantic information included in appliance description specifications 8 is analyzed (process step 117). Appliances 3 which are in close relationship are then grouped together (process step 118). A virtual node (V) is created to represent the group (process step 119). The node (V) is set as a parent and as a child of environment (process steps 120,121). Widgets among appliances 3 are added to represent semantic relationship (process step 122).

Figure 3:
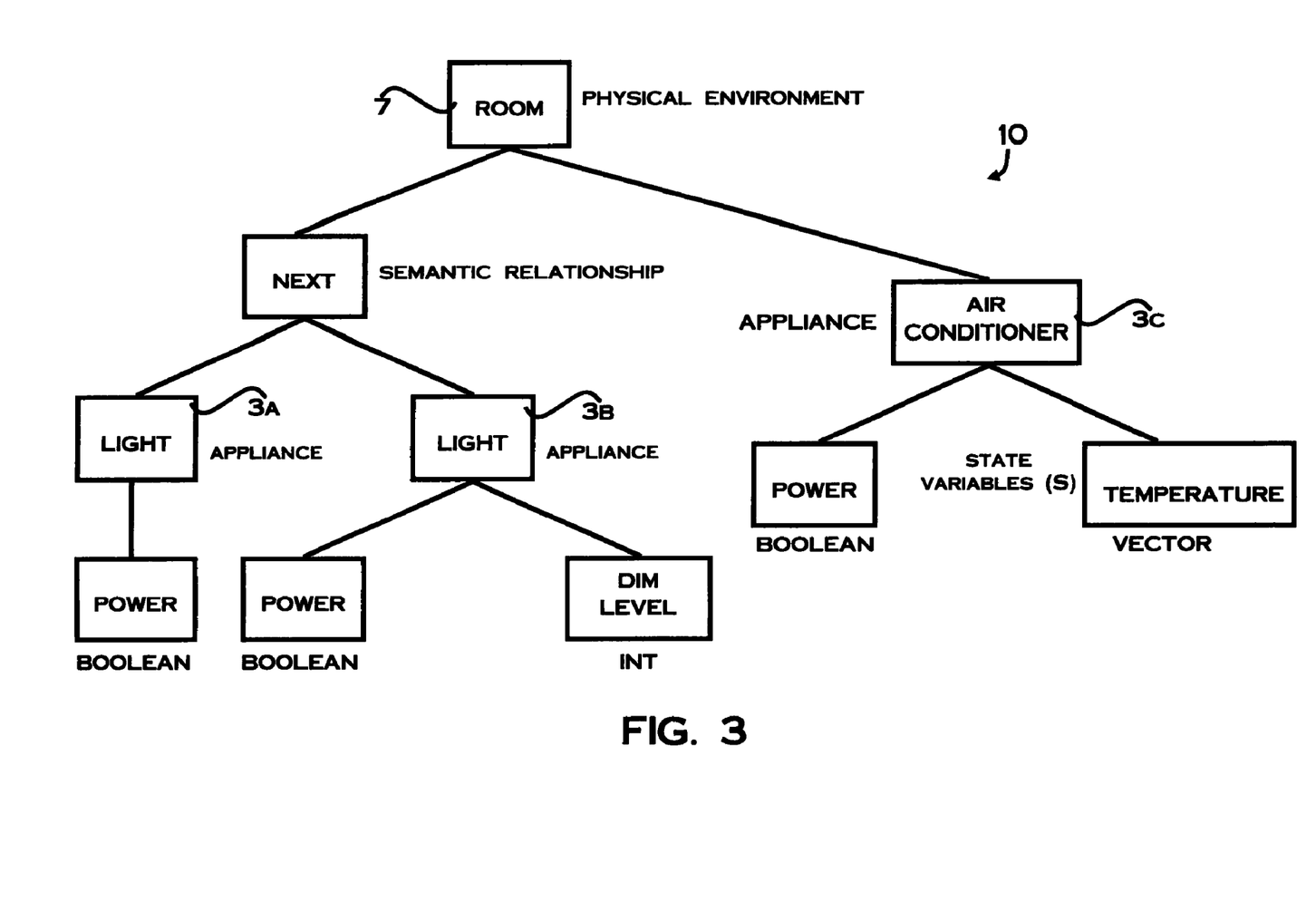
FIG. 3 illustrates an example of a semantic functionality tree.
Figure 7:
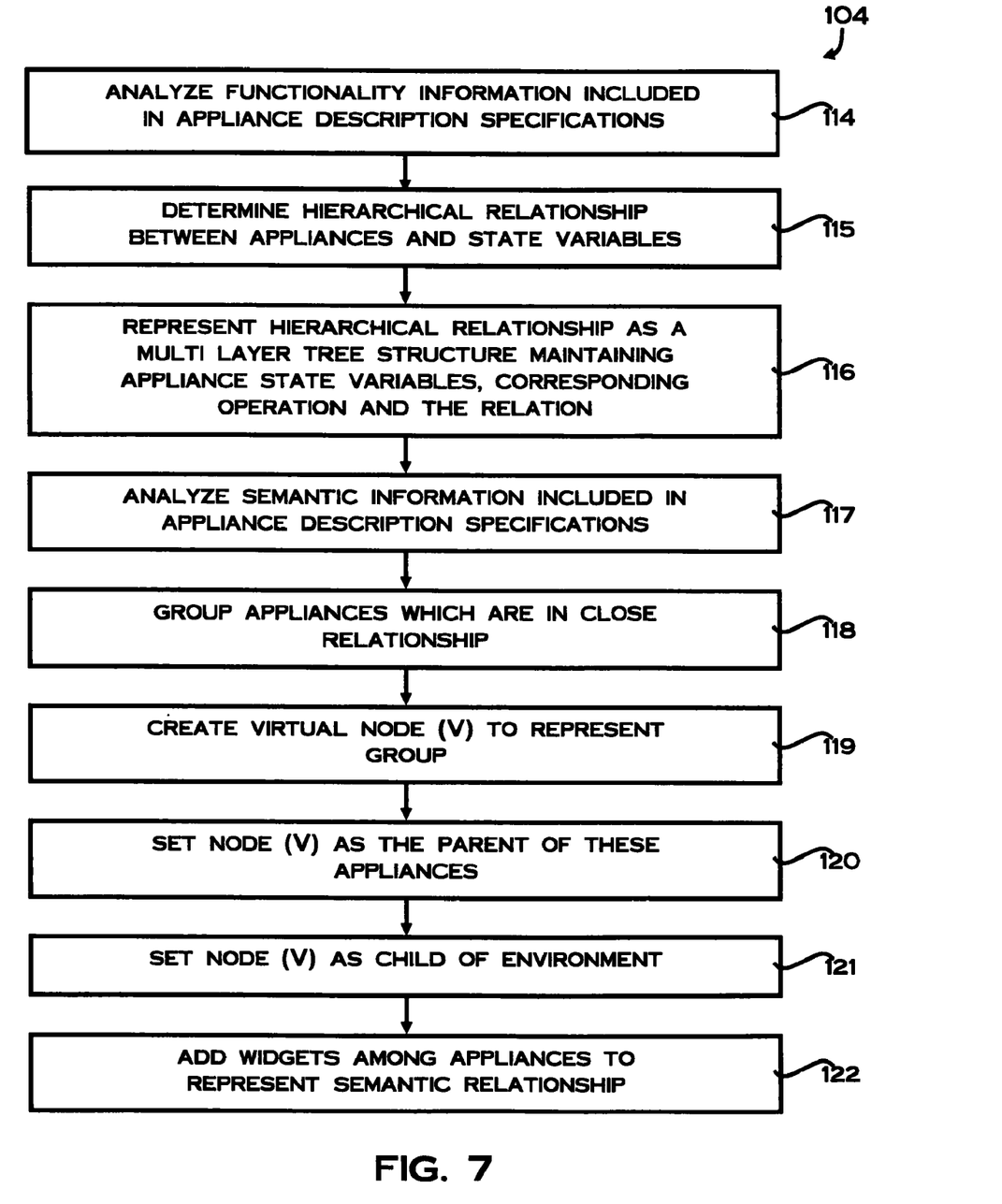

In order to implement process steps 114-117 of FIG. 7 in the automated system of FIG. 1, the description specification of the appliance is analyzed by an algorithm incorporated in the user interface rendering module 6 to construct a semantic functionality tree which maintains the appliance's state variable (S), the corresponding operation (O), the relations (R) among the variables and the relations (I) among the appliances 3. The semantic functionality tree is a hierarchical relation which is represented as a tree structure. For example, if a room 7 has three appliances, a light 3A, a dimmable light 3B and an air conditioner 3C and the two lights must be put together, the corresponding functionality tree 10 can be depicted as a three layer tree structure as shown in FIG. 3.

The user interface rendering module 6 illustrated in FIG. 1 can be configured to analyze the semantic information included in the appliance description once the aforementioned functionality tree 10 is obtained. If several appliances 3 have a tight or close relationship, they are assembled as a group (i.e., see process step 118 in FIG. 7). Next a virtual node is created to represent the group (i.e., see process step 119 in FIG. 7). The virtual node can be used to represent the semantic information (or relation) among the appliances. Generally, the relation can be represented as a widget when generating the interface, for example, Line<Object3,Object4> meaning draw a line between object 3 and object 4. Then the node is set as the parent of these appliances 3 and node is set also as the child of the environment (i.e., se process steps 120 and 121 in FIG. 7).

The criterion to judge the relativity among the appliance 3 is an open problem. It depends on the application. Sometimes the appliances 3 with same type can be put into a group. Sometimes the appliances 3, which can interact with each other, can be put into a group. Besides grouping some appliances 3, widgets can also be added (such as arrow line, animation, etc.) among multiple appliances 3 to represent the semantic relationship (process step 122).

Process step 105 of FIG. 1, that is, transforming semantic functionality tree into an interface elements tree, will now be described in more detail. The user interface rendering module 6 is configured to transform the state variables and the relations into interface elements and these interface element are organized into a tree with the same structure as the semantic functionality tree. For example, a Boolean variable can be transformed into Radiobutton or Check box widget, an Integer variable can be transformed into trackbar or listbox, and etc. Selecting what kinds of interface elements depends on the properties of controller 2, such as display size.

Figure 4:
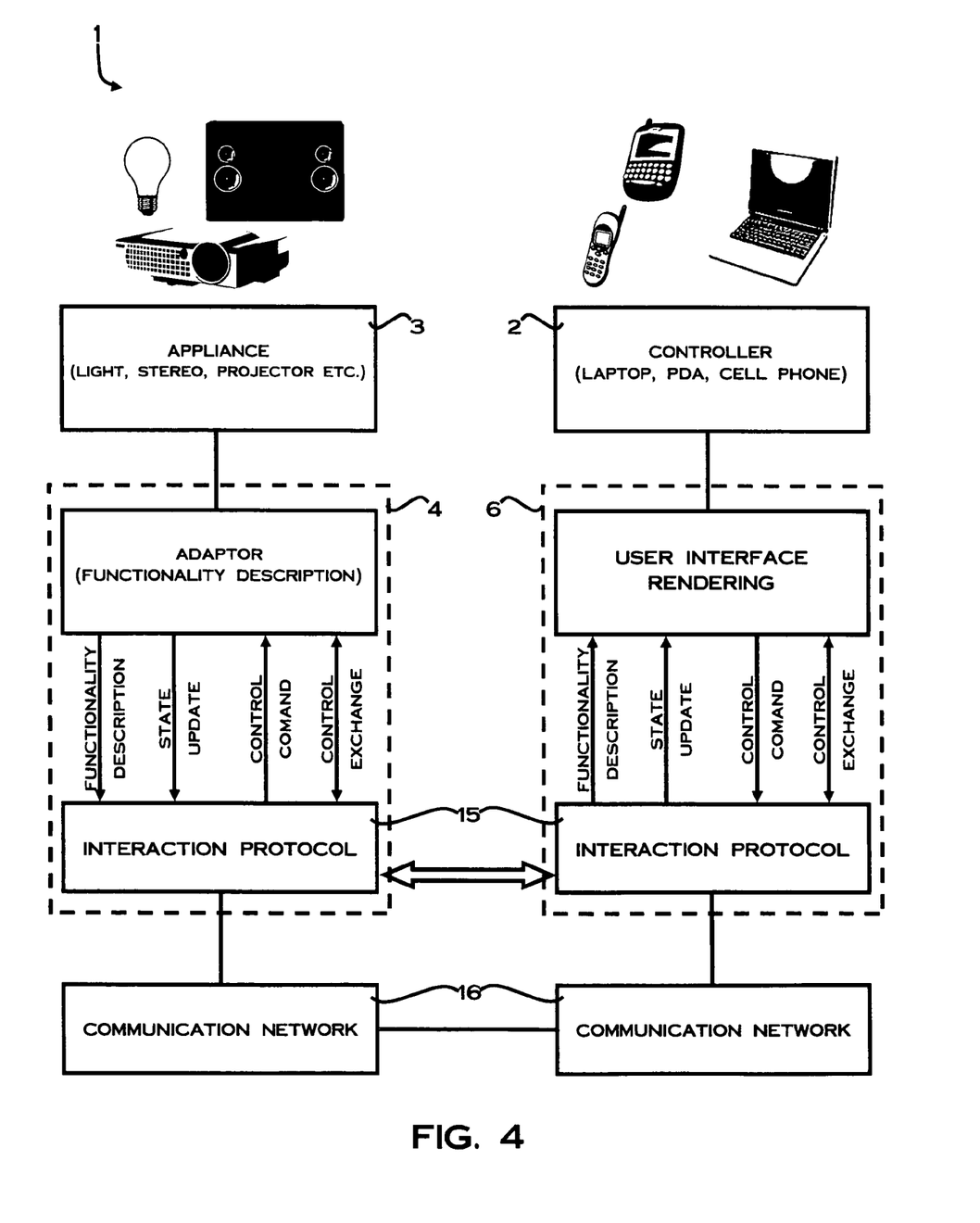
FIG. 4 illustrates the framework of the automated system of FIG. 1.

Referring now to FIG. 1 and additionally FIG. 4, which illustrates the framework of the system of FIG. 1, the framework allows generation of the adaptive user interface 5 for a physical environment at runtime on the controller 2. It is an open architecture. Based on the framework, the developer can define its own appliance specification and the communication protocol between appliance 3 and controller 2.

An interaction protocol 15 is integrated within both the appliance adaptor modules 4 and user interface rendering module 6. As already mentioned above, the adaptor module 4 lets the appliance 3 become a device, which can be manipulated and viewed remotely, and has the responsibility of maintaining the appliance description information in the form of the defined appliance description specification 8 The interaction protocol 15 is used to exchange information between appliance 3 and the controller 2. The main interaction is as follows: (1) the controller 2 can retrieve an appliance description specification 8 of an appliance 3; (2) when an appliance's state variable changes, the protocol 15 can notify the controller to refresh the user interface 5; (3) if the user manipulates the interface on the controller 2, the protocol can forward the user's action to drive the corresponding appliance 3; (4) the protocol provides a discovery mechanism so that the user can retrieve his wanted appliance 3 in the physical environment 7.

The user interface rendering module's responsibility is to generate the final concrete user interface 5 on the controller 2. Specifically, it includes: (1) analyze the appliance specification to construct it into a semantic functionality tree; (2) transform the semantic functionality tree into an interface elements tree based the properties of the controller 2; and (3) render a final concrete interface on the controller 2.

Figure 8:
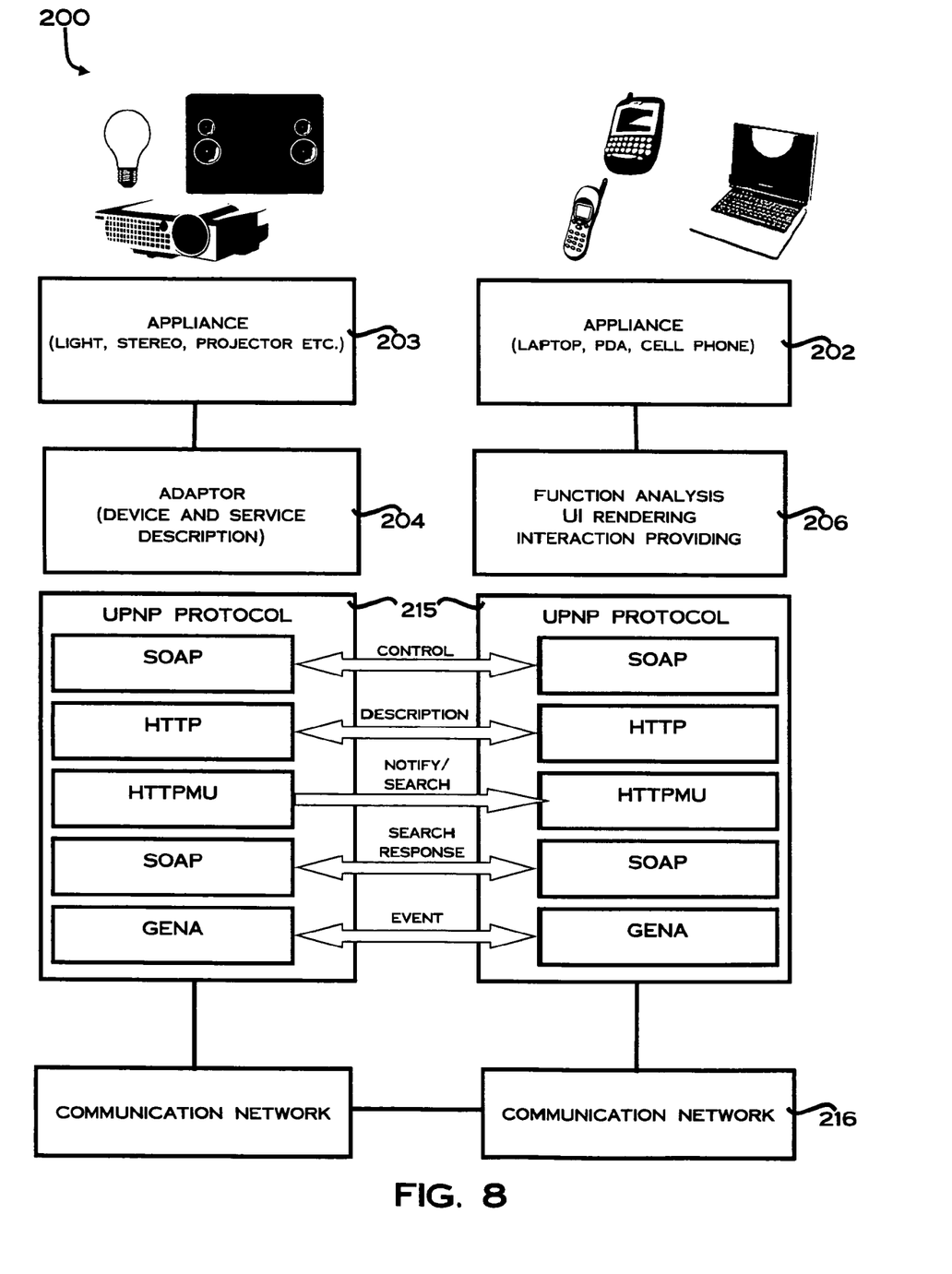
FIG. 8 illustrates the implementation architecture in which an UPnP's specification is adopted to describe the appliance functionality as the appliance description specification according to one embodiment.

The framework for implementing method 100 need not designate any special specification and protocol. The developer can select design or adopt a preferred specification and protocol. For example, the implementation architecture according to one embodiment is shown in system 200 of FIG. 8 in which a Universal Plug-n-Play (UPnP) specification is adapted to describe the appliance functionality as the appliance description specification 8. The controller 202 communicates with the appliance 203 by UPnP's protocol 215. A SUPPLE user interface rendering algorithm, which treats interface generation as an optimization problem, is used in the user interface rendering module 206 to generate the concrete user interface. Examples of SUPPLE can be found in an article entitled "Supple: automatically generating user interfaces" of K. Gajos and D. S. Weld, published in proceedings of IUT04, Funchal, Madeira, Portugal in 2004, the contents of which are incorporated herein by reference.

Unlike SUPPLE, which supposes the interface specification of a physical environment has been given, the method and system of the illustrative embodiments analyzes the semantic information among the appliances. For example, if information is being transmitted between two appliances, the controller determines this and the user rendering module displays these appliances next to each other.

Figure 9A:
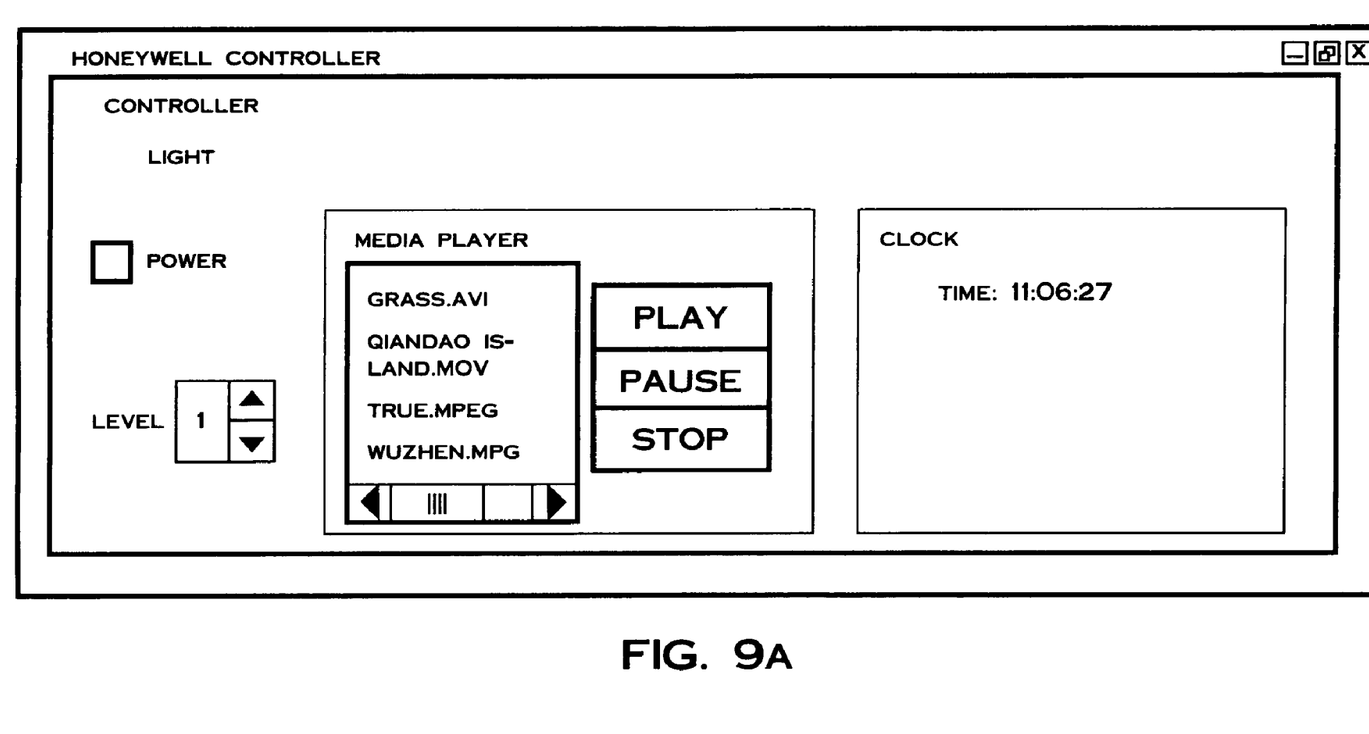
FIGS. 9A-9C illustrate respective screen shots of a display with the user interfaces of appliances rendered thereon using the system of FIG. 8.
Figure 9B:
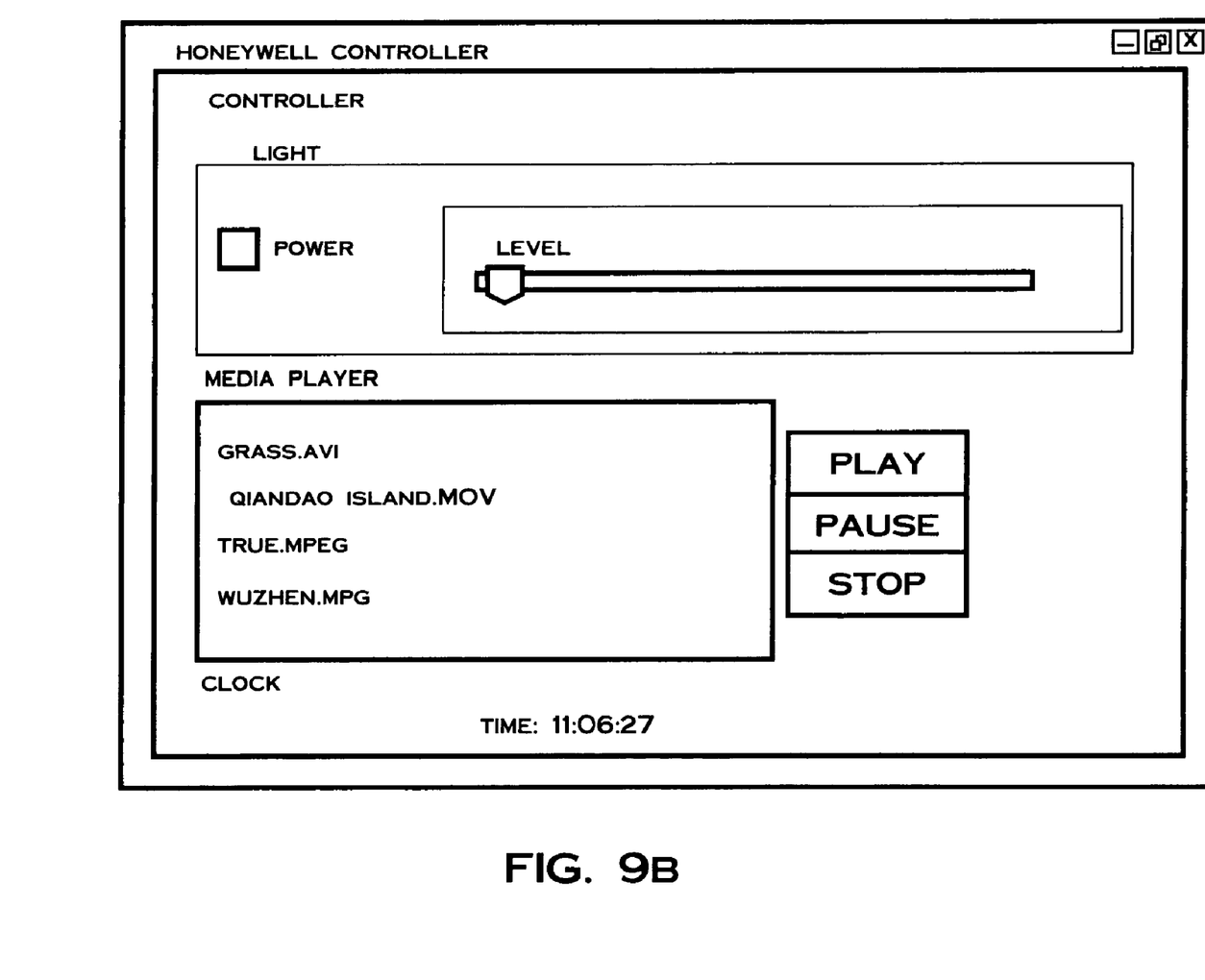
Figure 9C:
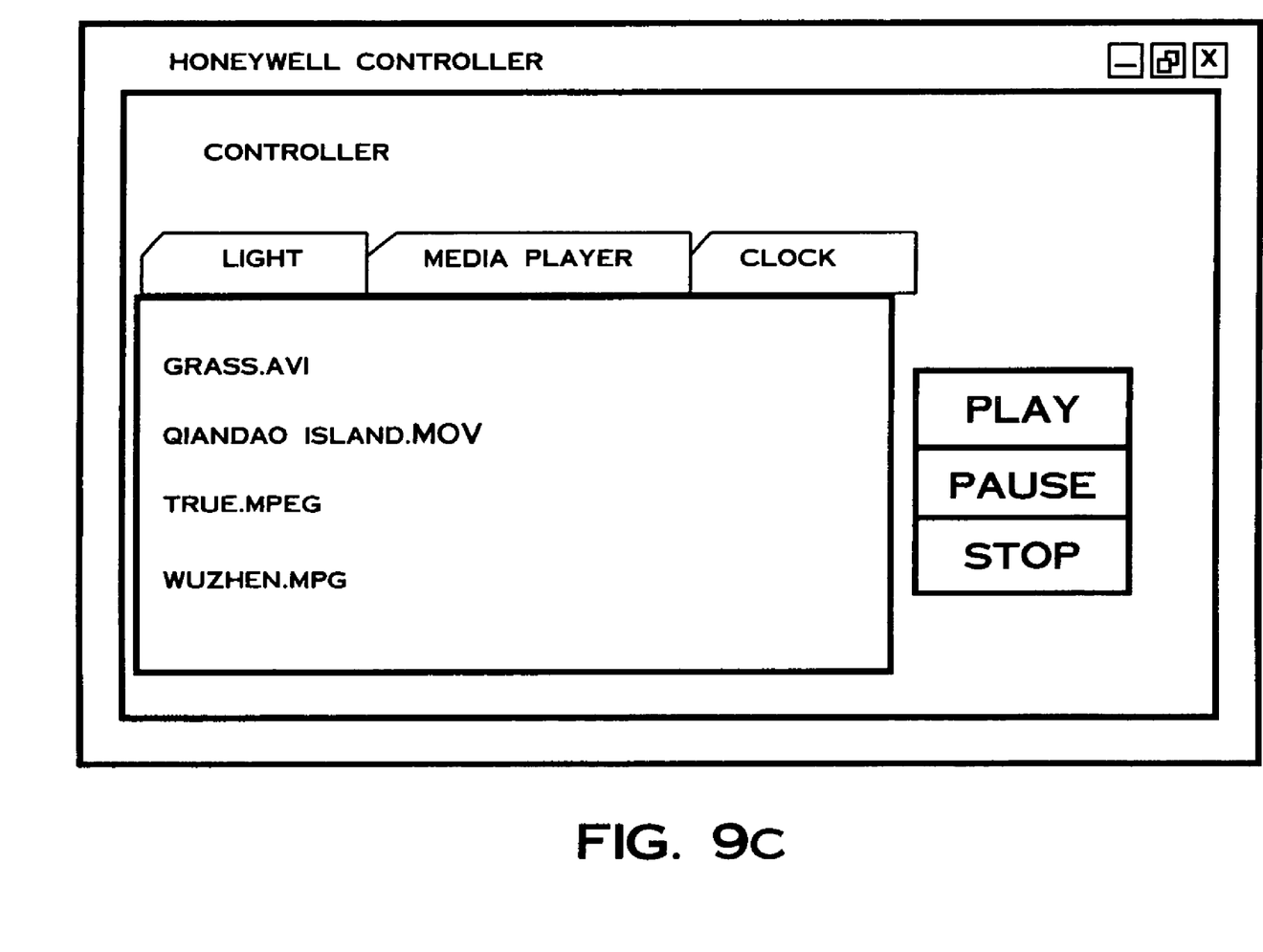

In order to more adequately explain the implementation of system 200, let us suppose there are three appliances in the physical environment: a dimmable light, a media player and a clock. FIG. 9A depicts an example screen shot of a final rendered user interface on the different display size. From FIG. 9A, we can know: (1) the rendering module put the dimmable Light next to Media Player for the Light has tight relativity with Media Player. Generally, we always dim the Light before we start to use the Media Player; (2) the user interface can adapt to different display size. The final rendition meets the controller's constraints and minimizes the user efforts. For example, when the display size decreases from FIG. 9A to FIG. 9B or from FIG. 9B to FIG. 9C, the user must afford to navigate among the tab widgets.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only.

Other variations and modifications of the present invention will be apparent to those of skill in the art, and it is the intent of the appended claims that such variations and modifications be covered.

The embodiments of the invention in which an exclusive property or right is claimed are defined as follows. Having thus described the invention what is claimed is:

1. A method of automatically generating an adaptive user interface for a plurality of appliances within a physical environment, said method comprising:
   generating appliance description specifications of said plurality of appliances in said physical environment from appliance functionality information comprising a set of state variables and corresponding operations wherein a state variable is represented as an interface and semantic information comprising a set of relations among said state variables of related appliances and/or related environment information; and
   rendering on a controller device said adaptive user interface based on said appliance description specifications, wherein rendering said adaptive user interface based on said appliance description specifications comprises:
   analyzing said appliance description specifications to construct a semantic functionality relationship among said appliances in said physical environment wherein analyzing each of said appliance description specifications comprises: determining a hierarchical relationship between appliances and said state variables; forming a functionality tree maintaining said appliance state variables, corresponding operations and relations among said state variables; analyzing said semantic information included in each of said appliance descriptions; assembling appliances in close relationship in a group; creating a virtual node to represent said group; setting said virtual node as a parent of appliances and child of environment; and adding widgets among said appliances to represent said semantic relationship;
   transforming said semantic functionality relationship into an interface elements relationship based on properties of said controller device; and
   rendering said adaptive user interface based on said interface elements relationship.

2. The method of claim 1 further comprising generating said appliance description specifications in response to manipulation of said user interface.

3. The method of claim 1 further comprising refreshing said adaptive user interface in response to a change in said state variable of said appliance.

4. The method of claim 1 further comprising:
   maintaining said appliance description specifications at corresponding appliances;
   retrieving said appliance description specifications from said appliances.

5. The method of claim 4 further comprising discovering a particular appliance among said plurality of appliances in response to manipulating a user interface.

6. The method of claim 1 further comprising:
   updating, changing or adding said appliance description specification in response to updating, changing or adding a corresponding appliance; and
   updating or changing said adaptive user interface in response thereto.

7. The method of claim 1 wherein said semantic information comprises information corresponding to appliance type, appliance location and/or appliance interactions.

8. An automated system for automatically generating an adaptive user interface for a plurality of appliances within a physical environment comprising:
   a processor;
   a data bus coupled to said processor;
   said plurality of appliances adapted and arranged to maintain corresponding appliance description specifications; and
   a controller device operably connectable to said plurality of appliances; said controller being adapted to:
   generate said appliance description specifications of said plurality of appliances in said physical environment from appliance functionality information comprising a set of state variables and corresponding operations wherein a state variable is represented as an interface and semantic information comprising a set of relations among said state variables of related appliances and/or related environment information provided to said controller;
   exchange said appliance description specifications between said appliances and said controller; and
   render said adaptive user interface based on said appliance description specifications; wherein said controller is further adapted to:
   analyze said appliance description specifications to construct a semantic functionality relationship among said appliances in said physical environment wherein analyzing each of said appliance description specifications comprises: determining a hierarchical relationship between appliances and said state variables; forming a functionality tree maintaining said appliance state variables, corresponding operations and relations among said state variables; analyzing said semantic information included in each of said appliance descriptions; assembling appliances in close relationship in a group; creating a virtual node to represent said group; setting said virtual node as a parent of appliances and child of environment; and adding widgets among said appliances to represent said semantic relationship;
   transform said semantic functionality relationship into an interface elements relationship based on properties of the controller; and
   render said adaptive user interface based on said interface elements relationship.

9. The system of claim 8 wherein said controller is further adapted to update or change said adaptive user interface in response to a change in an appliance state variable and/or an addition of an appliance.

10. The system of claim 8 wherein said controller is further adapted to generate said appliance description specifications in response to user manipulation of said user interface.

11. The system of claim 8, wherein said controller device is further adapted to refresh said adaptive user interface in response to a change in said state variable of said appliance.

12. The system of claim 8, wherein said controller device is further adapted to:
    maintain said appliance description specifications at corresponding appliances;
    retrieve said appliance description specifications from said appliances.

13. The system of claim 8, wherein said controller device is further adapted to discover a particular appliance among said plurality of appliances in response to manipulating a user interface.

14. A computer program product for automatically generating an adaptive user interface for a plurality of appliances within a physical environment, said computer program product embodied on a controller device comprising:
    a plurality of appliance adaptor modules and
    a user interface rendering module comprising a computer-usable tangible storage device storing instructions that, when executed by a computer:
    generate said appliance specifications of said plurality of appliances in said physical environment from appliance functionality information comprising a set of state variables and corresponding operations wherein a state variable is represented as an interface and semantic information comprising a set of relations among said state variables of related appliances and/or related environment information provided to said user interface rendering module;
    exchange said appliance description specifications between said appliance adaptor modules and said user interface rendering module; and
    render said adaptive user interface based on said appliance description specifications; wherein said user interface rendering module further comprises a computer-usable tangible storage device storing instructions that, when executed by a computer, is adapted to:
    analyze said appliance description specification to construct a semantic functionality relationship among said appliances in said physical environment wherein analyzing each of said appliance description specifications comprises: determining a hierarchical relationship between appliances and said state variables; forming a functionality tree maintaining said appliance state variables, corresponding operations and relations among said state variables; analyzing said semantic information included in each of said appliance descriptions; assembling appliances in close relationship in a group; creating a virtual node to represent said group; setting said virtual node as a parent of appliances and child of environment; and adding widgets among said appliances to represent said semantic relationship;
    transform said semantic functionality relationship into an interface elements relationship based on properties of the controller; and
    render said adaptive user interface based on said interface elements relationship.

15. The system of claim 14, wherein said user interface rendering module and said appliance adaptor modules each include an interaction protocol for exchanging information between said user rendering module and said appliance adaptor modules.

16. The system of claim 15, wherein said interaction protocol comprises an UPnP protocol and wherein said user interface rendering module also includes a SUPPLE user interface algorithm for rendering an adaptive user interface.

17. The system of claim 14, wherein said controller device is adapted to refresh said adaptive user interface in response to a change in said state variable of said appliance.

18. The system of claim 14, wherein said controller device is adapted to:
    maintain said appliance description specifications at corresponding appliances;
    retrieve said appliance description specifications from said appliances.

19. The system of claim 14, wherein said controller device is adapted to discover a particular appliance among said plurality of appliances in response to manipulating a user interface.

20. The system of claim 14, wherein said controller device is adapted to generate said appliance description specifications in response to manipulation of said user interface.

* * * * *